C. STILLE.
IMAGE TRANSFORMER FOR DISTANCE PHOTOGRAPHY.
APPLICATION FILED APR. 22, 1913.
1,141,850. Patented June 1, 1915.
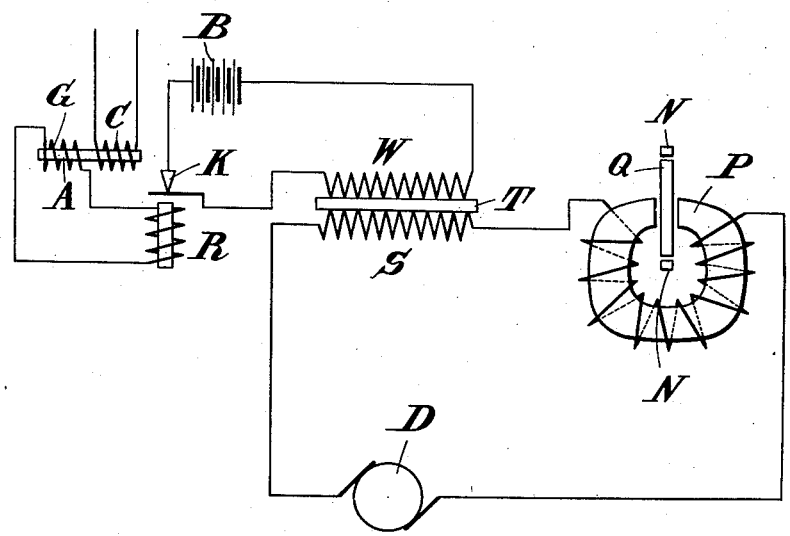
Witnesses.
Gertrude A. Lynch.
W. Wallace Nairn Jr.
Inventor.
Curt Stille
By Julian C. Dowell
his Attorney.

UNITED STATES PATENT OFFICE.

CURT STILLE, OF ZEHLENDORF-WEST, NEAR BERLIN, GERMANY.

IMAGE-TRANSFORMER FOR DISTANCE PHOTOGRAPHY.

1,141,850.  Specification of Letters Patent.  Patented June 1, 1915.

Application filed April 22, 1913. Serial No. 762,925.

*To all whom it may concern:*

Be it known that I, CURT STILLE, doctor of philosophy, of Zehlendorf-West, Germany, a subject of the King of Prussia, and whose post-office address is 4/5 Bülowstrasse, Zehlendorf-West, near Berlin, Kingdom of Prussia, German Empire, have invented a new and useful Image-Transformer for Distant Photography, of which the following is a specification.

It has been proposed to employ electro-optical polarization phenomena for the purpose of converting back into light-images electric currents, whose variations correspond to the local intensities of light of an object divided into sections from which object the currents are emitted or generated. To this end, a ray of light, polarized by means of Nicol's prisms, is led through a column of bisulfid of carbon and the like electro-optically sensitive substances, whereby the said column is placed in an electromagnetic field, whose intensity depends upon the variations of the light-currents. It has, however, been found in practice that the phenomena are much more intense when strong fields of lines of force are employed in such a manner, as to excite the field simultaneously by strong direct current and weak alternating current, so that the fields overlie each other.

The achievement of this object forms the subject of the present invention.

The invention is illustrated diagrammatically in the accompanying drawing.

The core A is magnetized by the coil C. In this coil flow the so-called "light currents," that is to say, currents whose intensity corresponds to the different degrees of brightness of the different parts of the object. The momentary magnetism of the core corresponds therefore to the momentary intensity of the "light current." The core has a further winding G in which currents are induced. The induced currents are transmitted by a relay R having a contact K to a local current circuit. In addition to the contact K, this current circuit contains a battery B and a winding W constituting the primary of a transformer T, of which the secondary is marked S. In the circuit of the secondary there is included a source of strong current (direct current) D, the secondary S, and a polarizer P. The latter consists, as above indicated, of a magnet for producing a powerful magnetic field, in which is placed a polarizing tube Q with two Nicol's prisms N. The purpose of this arrangement is to work with superposed or overlying fields instead of using the fields which are produced either directly by the "light currents," or indirectly by these in their transformed state.

The conversion into an image, is effected according to the foregoing by passing a ray of light through the polarizing apparatus whereby the intensity of the said ray is rendered dependent upon the variations of the "light currents." A strip coated with a substance sensitive to light (silver bromid gelatin) which passes through under the polarizing apparatus is exposed correspondingly to the current variations. The passage of the sensitized strip past the polarizing apparatus takes place in the same manner as the image (which is transmitted to a distance) passes in front of the light-sensitive cell at the transmitting station. Thus an intermittent sub-division and reconstitution of the image are effected by well known means at the transmitting and receiving stations respectively.

What I do claim as my invention, and desire to secure by Letters Patent of the United States, is:—

1. The process of converting light rays consisting in generating alternating current impulses in accordance with the light intensities of an object; impressing said impulses upon a direct current; and then subjecting polarized light rays to the influence of the resultant field of electric force.

2. The process of converting light rays consisting in polarizing the light rays; and subjecting the polarized light to the influence of simultaneous strong direct and weak alternating electric currents.

3. An apparatus for converting light rays comprising an electro-optical polarizing device; and means for producing simultaneously direct and alternating currents within said device.

4. An apparatus for converting light rays comprising an electro-optical polarizing device; and means for generating a magnetic field in the polarizer by a primary direct current and a secondary alternating current.

5. An apparatus for converting light rays comprising a local direct current circuit; an electro-optical polarizing device in said circuit; and an alternating current circuit adapted to carry electric current impulses dependent upon the variation of light intensity of the object.

6. An apparatus for converting light rays comprising a local direct current circuit; an electro-optical polarizing device in said circuit; an alternating current circuit adapted to carry current impulses dependent upon the variation of light intensity of the object; and an interrupter and transformer associated with said circuits to produce simultaneously strong direct and weak alternating currents in the polarizing device of the local circuit.

In testimony whereof I have hereunto set my hand in presence of two subscribing witnesses.

CURT STILLE.

Witnesses:
 WALDEMAR CHRISKENNY,
 HANS TROGIL.